United States Patent
Lee et al.

(10) Patent No.: US 9,503,977 B2
(45) Date of Patent: Nov. 22, 2016

(54) METHOD AND APPARATUS FOR REDUCING WIRELESS TRAFFIC BY CONTROLLING MANAGEMENT FRAME IN WIRELESS LOCAL AREA NETWORK (WLAN)

(71) Applicant: Electronics and Telecommunications Research Institute, Daejeon (KR)

(72) Inventors: Je Hun Lee, Daejeon (KR); Sok Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 14/174,445

(22) Filed: Feb. 6, 2014

(65) Prior Publication Data
US 2014/0307545 A1   Oct. 16, 2014

(30) Foreign Application Priority Data
Apr. 15, 2013   (KR) ........................ 10-2013-0041002

(51) Int. Cl.
*H04W 28/02*  (2009.01)
*H04W 52/02*  (2009.01)
*H04L 12/823* (2013.01)

(52) U.S. Cl.
CPC ........ *H04W 52/0216* (2013.01); *H04L 47/323* (2013.01); *H04W 28/0205* (2013.01); *H04W 52/0206* (2013.01); *Y02B 60/50* (2013.01)

(58) Field of Classification Search
CPC .......... H04W 28/02; H04W 52/0206; H04W 52/0216; H04W 28/0221
See application file for complete search history.

(56) References Cited

U.S. PATENT DOCUMENTS

| | | | |
|---|---|---|---|
| 7,333,460 B2* | 2/2008 | Vaisanen | H04W 48/12 370/230 |
| 7,570,623 B2 | 8/2009 | Huang et al. | |
| 2004/0192284 A1* | 9/2004 | Vaisanen | H04W 48/12 455/422.1 |
| 2010/0284316 A1* | 11/2010 | Sampathkumar | H04W 52/0216 370/311 |
| 2012/0230319 A1* | 9/2012 | Zaitsu | H04W 52/0216 370/338 |
| 2013/0111044 A1* | 5/2013 | Cherian | H04L 65/1066 709/228 |
| 2014/0023053 A1* | 1/2014 | Park | H04W 48/10 370/336 |
| 2014/0269463 A1* | 9/2014 | Miryala | H04W 48/12 370/311 |

\* cited by examiner

*Primary Examiner* — Ian N Moore
*Assistant Examiner* — Lakeram Jangbahadur
(74) *Attorney, Agent, or Firm* — NSIP Law

(57) ABSTRACT

Provided is a method and apparatus for reducing wireless traffic by controlling a management frame of an access point (AP) in a wireless local area network (WLAN), the AP including a beacon frame generator to generate a beacon frame, a probe response generator to generate a probe response frame, and a management frame control unit to control at least one of a period of the beacon frame and a number of retransmissions of the probe response frame, based on at least one of a power consumption of the AP, a system load imposed on a system including the AP, and an emergency level related to whether an emergency occurs.

12 Claims, 9 Drawing Sheets

METHOD AND APPARATUS FOR REDUCING WIRELESS TRAFFIC BY CONTROLLING MANAGEMENT FRAME IN WIRELESS LOCAL AREA NETWORK (WLAN)

CROSS-REFERENCE TO RELATED APPLICATION

This application claims the priority benefit of Korean Patent Application No. 10-2013-0041002, filed on Apr. 15, 2013, in the Korean Intellectual Property Office, the disclosure of which is incorporated herein by reference.

BACKGROUND

1. Field of the Invention

The present invention relates to technology for reducing wireless traffic by controlling a management frame in a wireless local area network (WLAN) environment.

2. Description of the Related Art

With a propagation of devices providing a wireless local area network (WLAN) function, such as a smartphone, companies and public institutions are establishing a wide range of WLANs to provide a preferable service. Also, various services using an application for a smartphone are being developed or used.

However, an increase in an amount of traffic is also due to an increasing number of WLAN devices included in a limited space. Thus, efficient use of wireless resources may not be realized due to an occurrence of collisions.

A result of monitoring a sixth channel, which is a WLAN channel used most frequently on an hourly basis, indicates that among a total of 330,000 packets, 36.8% correspond to beacon frames, and 39% correspond to probe response frames. Thus, approximately 75% of all frames correspond to management frames transmitted by an access point (AP).

In the WLAN, since all devices may acquire wireless resources through competition to perform communication, a plurality of management frames may result in an overall waste of wireless resources.

Accordingly, there is a desire for technology that may reduce an amount of wireless traffic, by controlling a management frame control of an AP in the WLAN based on a situation.

SUMMARY

According to an aspect of the present invention, there is provided an access point (AP) including a beacon frame generator to generate a beacon frame, a probe response generator to generate a probe response frame, and a management frame control unit to control at least one of a period of the beacon frame and a number of retransmissions of the probe response frame, based on at least one of a power consumption of the AP, a system load imposed on a system including the AP, and an emergency level related to whether an emergency occurs.

The management frame control unit may include a priority control unit to control a priority set for at least one of the power consumption, the system load, and the emergency level.

The management frame control unit may include a system policy control unit to determine a management policy for an AP system.

The management frame control unit may sense that a connected station (STA) enters a sleep mode, and transfer, to the STA, information associated with the period of the beacon frame.

The management frame control unit may sense that a connected STA enters a sleep mode, increase the period of the beacon frame, and reduce the number of probe response frame retransmissions.

When a connected STA shifts from a sleep mode to an active mode, the management frame control unit may suspend controlling one of the period of the beacon frame and the number of retransmissions of the probe response frame.

When a difference between a predetermined level and at least one of the period of the beacon frame and the number of retransmissions of the probe response frame is greater than or equal to a preset value, the management frame control unit may control the period of the beacon frame or the number of retransmissions of the probe response frame to reduce a degree of the difference while controlling one of the period of the beacon frame and the number of probe response frame retransmissions is suspended.

When the system load is increased, the management frame control unit may increase the period of the beacon frame and reduce the number of retransmissions of the probe response frame.

When the system load is reduced, the management frame control unit may increase the number of retransmissions of the probe response frame, and reduce the period of the beacon frame based on whether an amount of internal resources available in the system is greater than a threshold.

When the emergency occurs, the management frame control unit may control the period of the beacon frame or the number of retransmissions of the probe response frame based on whether a power is being stably supplied to the AP.

When the power being supplied is stable, the management frame control unit may reduce the period of the beacon frame and increase the number of retransmissions of the probe response frame, and when the power being supplied is unstable, the management frame control unit may increase the period of the beacon frame and reduce the number of retransmissions of the probe response frame.

According to another aspect of the present invention, there is provided a management frame control method of an AP, the method including generating a beacon frame transmitted to at least one STA or a probe response frame corresponding to a probe request frame received from the at least one STA, monitoring at least one of a power consumption of the AP, a system load imposed on a system including the AP, and an emergency level related to whether an emergency occurs, and controlling at least one of a period of the beacon frame and a number of retransmissions of the probe response frame based on at least one of the power consumption, the system load, and the emergency level.

The management frame control method of an AP may further include controlling a priority set for at least one of the power consumption, the system load, and the emergency level, wherein the controlling of at least one of the period of the beacon frame and the number of retransmissions of the probe response frame may include controlling at least one of the period of the beacon frame and the number of retransmissions of the probe response frame in consideration of at least one of the power consumption, the system load, and the emergency level, based on the set priority.

The controlling may include sensing that a connected STA enters a sleep mode, increasing the period of the beacon frame, and reducing the number of retransmissions of the probe response frame.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
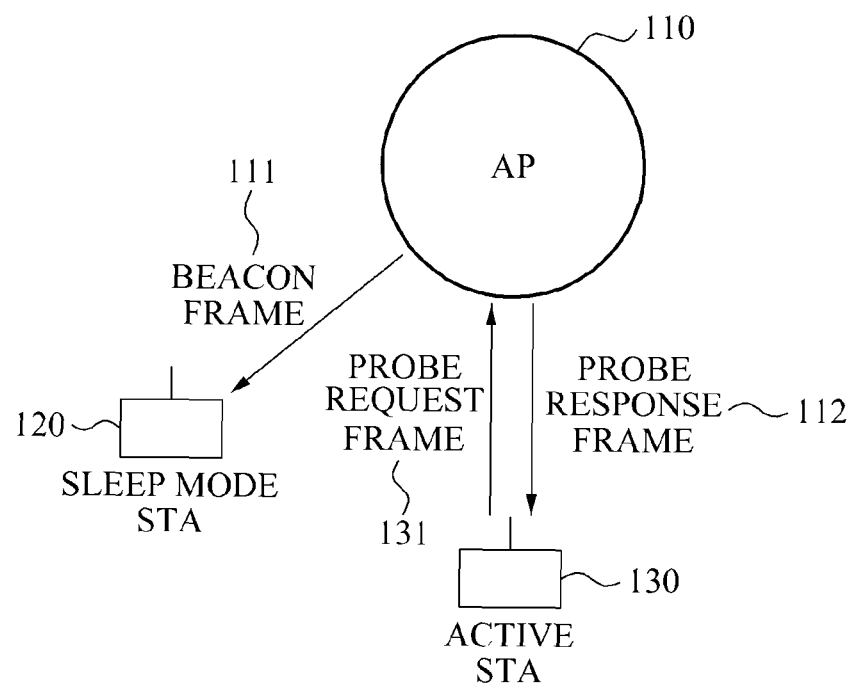
FIG. 1 is a diagram illustrating an access point (AP) 110 and a station (STA) located around the AP according to an example embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an access point (AP) 110 and a station (STA) located around the AP according to an example embodiment.

Referring to FIG. 1, an STA connected to the AP 110 may include a sleep mode STA 120 or an active STA 130.

The sleep mode STA 120 may receive a beacon frame 111 transmitted from the AP 110.

The active STA 130 may transmit a probe request frame 131 to the AP 110. The AP 131 may transmit a probe response frame 112 in response to the probe request frame 131.

Although not shown in FIG. 1, the AP may transmit the beacon frame 111 to the active STA 130.

A type of the STA connected to the AP 110 may not be limited on the sleep mode STA 120 and the active STA 130.

Figure 2:
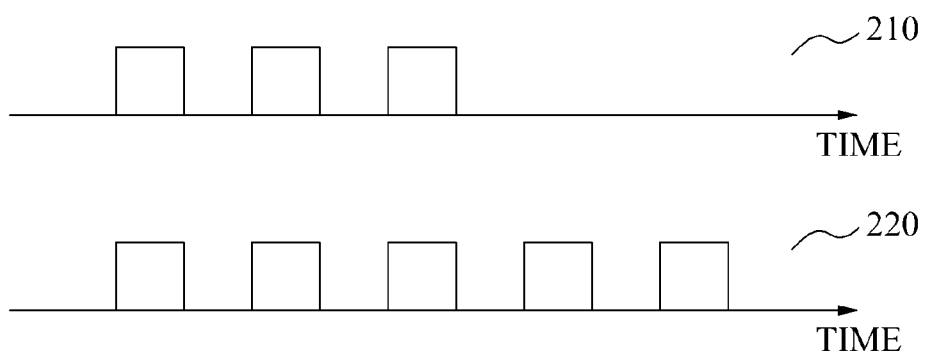
FIG. 2 is a diagram illustrating a change in a number of retransmissions of the probe response frame 112 transmitted from the AP 110 to the STA according to an example embodiment.

FIG. 2 is a diagram illustrating a change in a number of retransmissions of the probe response frame 112 transmitted from the AP 110 to the STA according to an example embodiment.

When the STA connected to the AP 110 corresponds to the sleep mode STA 120, the AP 110 may reduce the number of retransmissions of the probe response frame 112. For example, the number of retransmissions of the probe response frame 112 may be five, as indicated by a graph 220. When the connected STA corresponds to the sleep mode STA 120, the number of retransmissions of the probe response frame 112 may be reduced to three, as indicated by a graph 210.

When a system load of the AP 110 is reduced, the AP 110 may increase the number of retransmissions of the probe response frame 112. For example, the number of retransmissions of the probe response frame 112 may be three, as indicated by the graph 210. When the system load of the AP 110 is reduced, the number of retransmissions of the probe response frame 112 may be increased to five, as indicated by the graph 220.

When a power is being stably supplied to the AP 110, the AP 110 may increase the number of retransmissions of the probe response frame 112.

In terms of controlling a management frame of the AP 110, when the number of retransmissions of the probe response frame 112 is reduced, unnecessary frame transmission may be prevented. In an unfavorable wireless environment, transmitting the probe response frame 112 may not be required. Also, when the number of retransmissions of the probe response frame 112 is reduced, an admission control unit may be controlled indirectly.

In terms of controlling a management frame of the AP 110, when the number of retransmissions of the probe response frame 112 is increased, unnecessary transmission of the probe request frame 131, by the STA, may be prevented.

Figure 3:
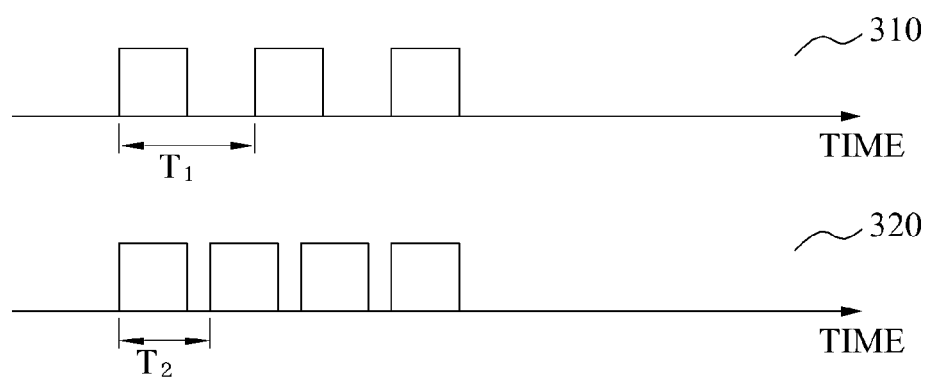
FIG. 3 is a diagram illustrating a change in a period of the beacon frame 111 transmitted from the AP 110 according to an example embodiment.

FIG. 3 is a diagram illustrating a change in a period of the beacon frame 111 transmitted from the AP 110 according to an example embodiment.

When an STA connected to the AP 110 enters a sleep mode, the AP 110 may increase the period of the beacon frame 111. For example, the period of the beacon frame 111 may correspond to $T_2$ of a graph 320. When the STA enters the sleep mode, the period of the beacon frame 111 may be increased to $T_1$ of a graph 310. Here, $T_1$ is greater than $T_2$. When a system load of the AP 110 is reduced, the AP 110 may reduce the period of the beacon frame 111. For example, the period of the beacon frame 111 may correspond to $T_1$ of the graph 310. When the system load of the AP 110 is reduced, the period of the beacon frame 111 may be reduced to $T_2$ of the graph 320. Here, $T_1$ is greater than $T_2$. When a power is being stably supplied to the AP 110, the AP 110 may reduce the period of the beacon frame 111.

In terms of controlling a management frame of the AP 110, when the period of the beacon frame 111 is increased, a power-saving effect may be realized in the AP 110. Also, the admission control unit may be controlled indirectly. When a relatively large number of the sleep mode STAs 120 is present, a space for storing a frame of a corresponding STA may be increased and thus, additional resources may be consumed. In terms of controlling a management frame of the AP 110, when the period of the beacon frame 111 is reduced, STAs located around the AP 110 may perform an access with increased ease. Also, when the period of the beacon frame 111 is reduced, a change in a system status may be immediately reported. When the relatively large number of the sleep mode STAs 120 is present, a resource-saving effect may be realized.

Figure 4:
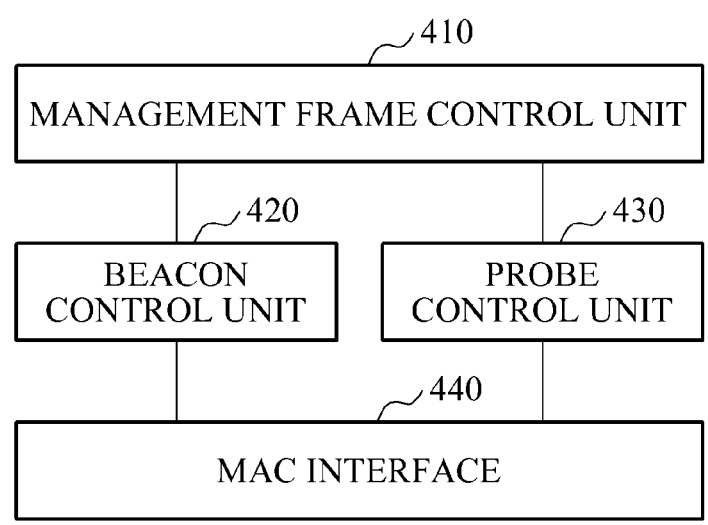
FIG. 4 is a block diagram illustrating an example of controlling a management frame of the AP 110 transmitting the beacon frame 111 and the probe response frame 112 according to an example embodiment.

FIG. 4 is a block diagram illustrating an example of controlling a management frame of the AP 110 transmitting the beacon frame 111 and the probe response frame 112 according to an example embodiment.

Referring to FIG. 4, an AP according to an example embodiment may include a management frame control unit 410 to control a management frame of an entire system, a beacon control unit 420 controlled by the management frame control unit 410, and a probe control unit 430 controlled by the management frame control unit 410. The AP may also include a MAC interface 440 to transfer information controlled by the management frame control unit 410 to a MAC. The management frame control unit 410 may be also referred to as a management frame controller. The beacon control unit 420 may be also referred to as a beacon frame generator, and the beacon control unit 430 may be also referred to as a probe response generator.

The beacon control unit 420 may increase or reduce a period of the beacon frame 111 based on a command of the management frame control unit 410. Also, the period of the beacon frame 111 may be changed based on a control of the management frame control unit 410. For example, as described in FIG. 3, the AP 110 may change the period of the beacon frame 111 from $T_1$ to $T_2$ or from $T_2$ to $T_1$.

The probe control unit 430 may adjust a number of retransmissions of the probe response frame 112 based on the command of the management frame control unit 410. Thus, a number of unnecessary retransmissions performed by the probe response frame 112 may be reduced. The number of retransmissions of the probe response frame 112 may be changed based on a control of the management frame control unit 410. For example, as described in FIG. 2, the number of retransmissions of the probe response frame 112 may be changed from three to five, or from five to three.

Figure 5:
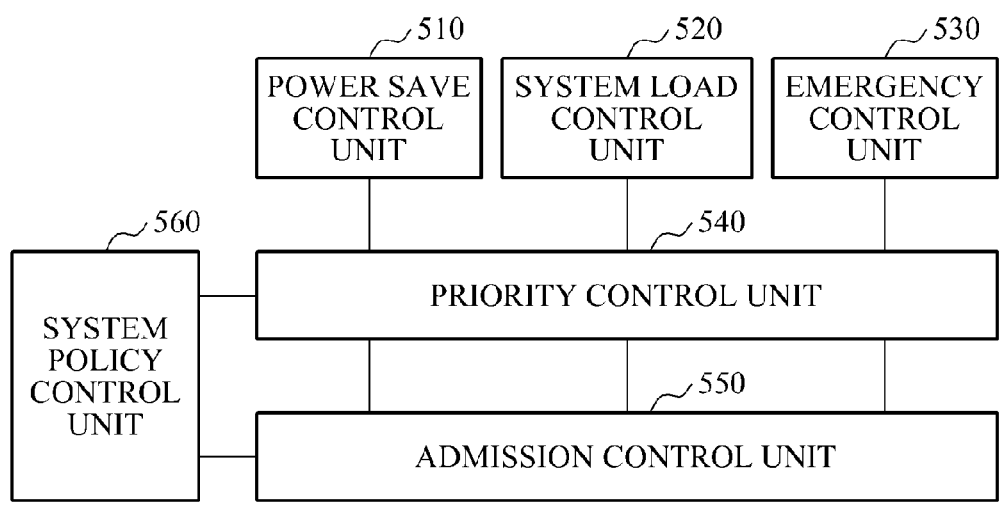
FIG. 5 is a block diagram illustrating a configuration of the management frame control unit 410 according to an example embodiment.

FIG. 5 is a block diagram illustrating a configuration of the management frame control unit 410 according to an example embodiment.

Referring to FIG. 5, the management frame control unit 410 includes a power save control unit 510, a system load control unit 520, an emergency control unit 530, a priority control unit 540, an admission control unit 550, and a system policy control unit 560.

The power save control unit 510 may transfer, to the admission control unit 550, information associated with a sleep mode state of an STA connected to the AP 110.

The system load control unit 520 may transfer, to the admission control unit 550, information associated with a system load state of the AP 110.

When an emergency such as a natural disaster occurs, the emergency control unit 550 may transfer information associated with the emergency to the admission control unit 550. Although a range of the present invention does not include a disaster response method, disaster response systems require information associated with an emergency. In the example embodiment, a function of managing a system by transferring the information associated with an emergency may be provided.

The emergency may include an unacceptable level of crisis in a daily life, as well as a predetermined situation defined in a system management level and a natural disaster, for example, a typhoon or a flood.

In a management frame control method of the AP 110 according to an example embodiment, a system management policy of the AP 110 may be determined by the system policy control unit 560. Also, the system policy control unit 560 may transfer information associated with the system management policy to the priority control unit 540 and the admission control unit 550.

The system policy control unit 560 may determine the system management policy of the AP 110 using an interface such as a display for use in management, which is included in the AP 110. The system policy control unit 560 may transfer the information associated with the system management policy to the priority control unit 540 and the admission control unit 550. The admission control unit 550 may control one of the beacon frame 111 and the probe response frame 112.

Figure 6:
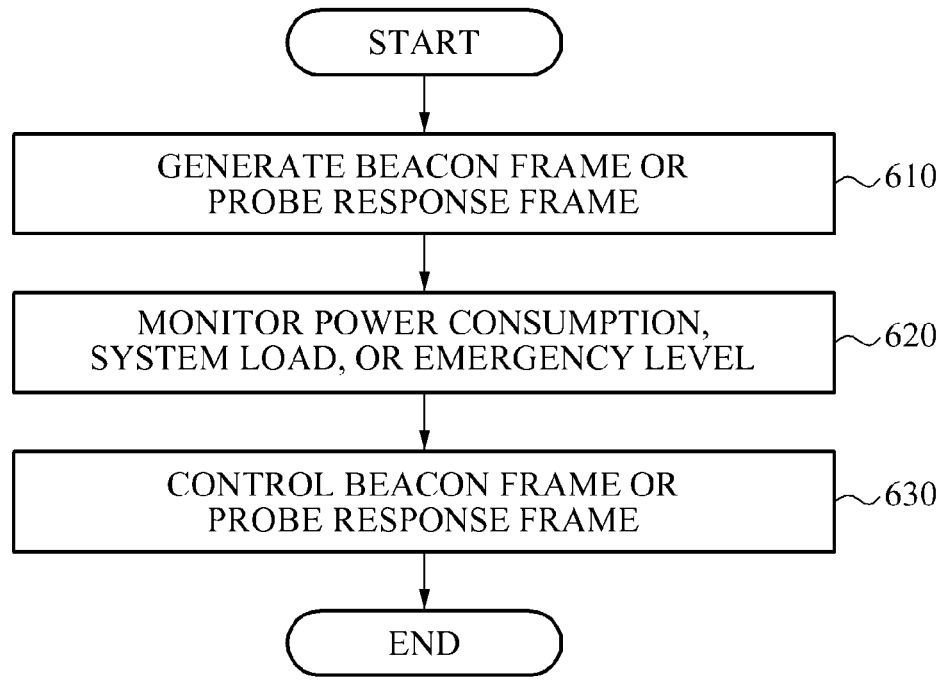
FIG. 6 is a flowchart illustrating a management frame control method of the AP 110 according to an example embodiment.

FIG. 6 is a flowchart illustrating a management frame control method of the AP 110 according to an example embodiment.

In the management frame control method of the AP 110, in operation 610, the beacon frame 111 transmitted from the AP 110 to at least one STA, or the probe response frame 112 corresponding to the probe request frame 131 received from the at least one STA may be generated.

In operation 620, one of a power consumption of the AP 110, a system load imposed on a system including the AP 110, and an emergency level related to an emergency situation may be monitored.

In operation 630, at least one of a period of the beacon frame 111 and a number of retransmissions of the probe response frame 112 may be controlled based on one of the power consumption of the AP 110, the system load, and the emergency level.

Although not shown in FIG. 6, in operation 630, a priority set for one of the power consumption of the AP 110, the system load, and the emergency level may be controlled. In such a case, at least one of the period of the beacon frame 111 and the number of retransmissions of the probe response frame 112 may be controlled in consideration of at least one of the power consumption of the AP 110, the system load, and the emergency level based on a priority.

Figure 7:
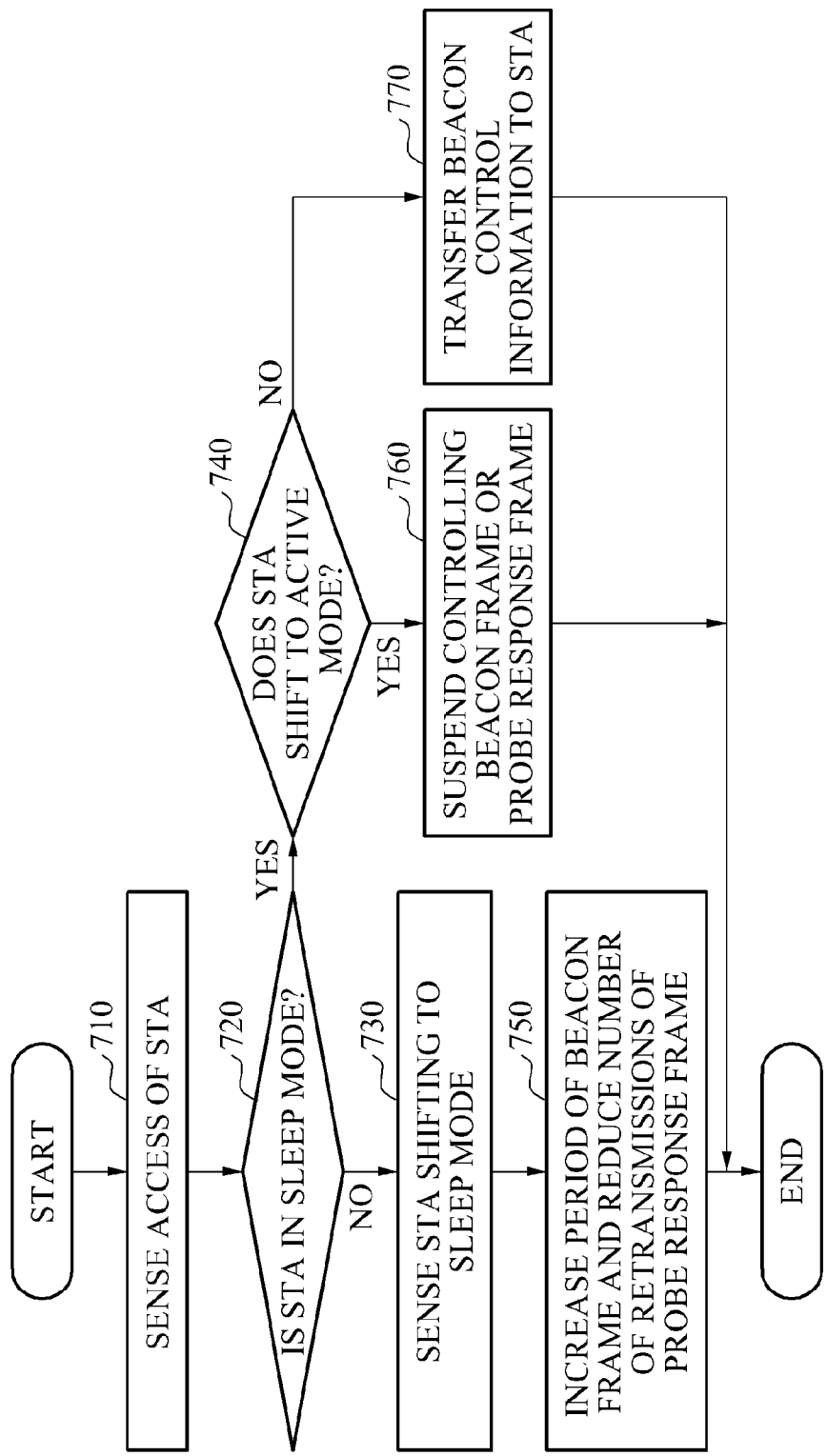
FIG. 7 is a flowchart illustrating an example of processing information input by the power save control unit 510 according to an example embodiment.
Figure 8:
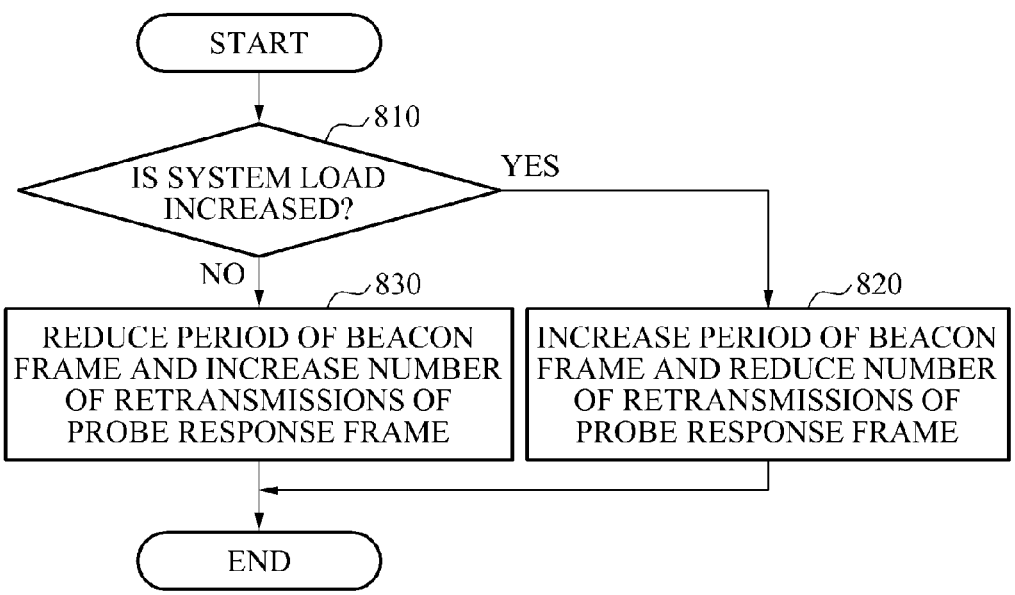
FIG. 8 is a flowchart illustrating an example of processing information input by the system load control unit 520 in a management frame control of the AP 110 according to an example embodiment.
Figure 9:
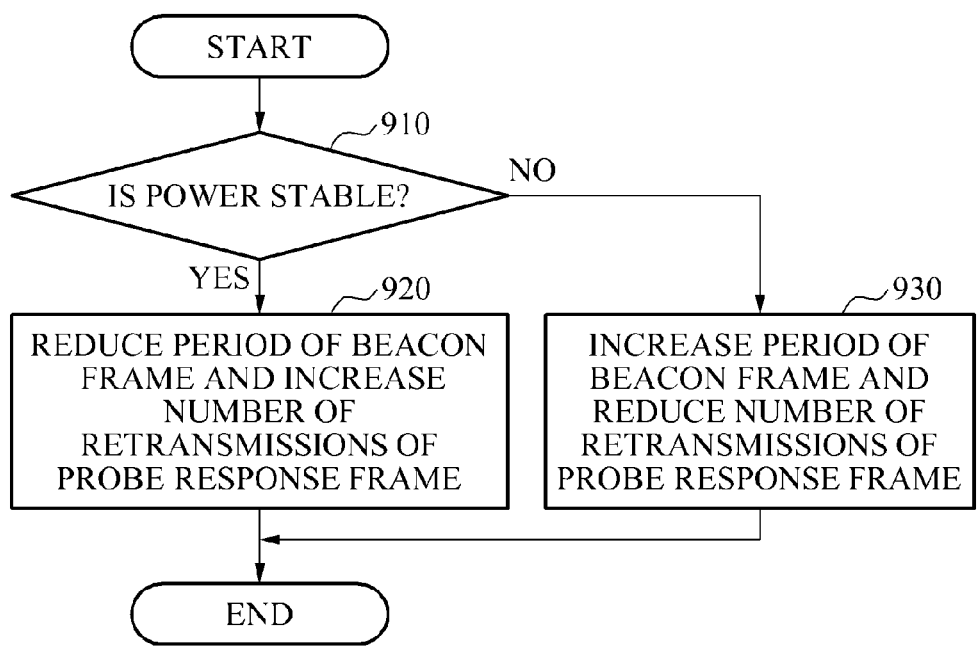
FIG. 9 is a flowchart illustrating an example of recognizing an emergency based on information input by the emergency control unit 530 such as a disaster prevention system in a management frame control of the AP 110 according to an example embodiment.

Descriptions pertaining to operation 630 of controlling the beacon frame 111 or the probe frame 112 will be provided with reference to FIGS. 7 through 9.

FIG. 7 is a flowchart illustrating an example of processing information input by the power save control unit 510 according to an example embodiment.

In operation 710, the AP 110 may sense whether an STA is connected to the AP 110.

In operation 720, whether the connected STA corresponds to the sleep mode STA 120 may be identified.

When the connected STA does not correspond to the sleep mode STA 120, shifting of the connected STA to a sleep mode may be sensed in operation 730.

In operation 750, when the connected STA enters the sleep mode, the AP 110 may increase a period of the beacon frame 111, and reduce a number of retransmissions of the probe response frame 112. Thus, unnecessary transmission may be avoided, thereby saving wireless resources.

When the connected STA corresponds to the sleep mode STA 120, shifting of the connected STA to an active mode may be sensed in operation 740.

In operation 770, when the connected STA is in a sleep mode dependent on the period of the beacon frame 111, beacon control information modified in accordance with the present invention may be transferred to the connected STA.

In operation 760, when the connected STA shifts from the sleep mode to the active mode, the AP 110 may suspend controlling of the beacon frame 111 and the probe response frame 112.

Although not shown in FIG. 7, when the connected STA shifts from the sleep mode to the active mode, a difference between the period of the beacon frame 111 and the number of retransmissions of the probe response frame 112 is measured at a point in time when a corresponding STA enters the sleep mode, and a current value may be greater than or equal to a predetermined value. Thus, the current value may be adjusted to reduce a degree of the difference.

FIG. 8 is a flowchart illustrating an example of processing information input by the system load control unit 520 in a management frame control of the AP 110 according to an example embodiment.

In operation 810, whether a system load of the AP 110 is increased may be sensed.

In operation 820, when the system load of the AP 110 is increased, the AP 110 may increase a period of the beacon frame 111, and reduce a number of retransmissions of the probe response frame 112.

In operation 830, when the system load of the AP 110 is reduced, the AP 110 may reduce the period of the beacon frame 111 and increase the number of retransmissions of the probe response frame 112.

Although not shown in FIG. 8, when the system load of the AP 110 is reduced and an amount of system internal resources is sufficient, the period of the beacon frame 111 may be reduced and the number of retransmissions of the probe response frame 112 may be increased based on a threshold. The threshold may be set based on at least one of the system load and the system internal resources.

FIG. 9 is a flowchart illustrating an example of recognizing an emergency based on information input by the emergency control unit 530 such as a disaster prevention system in a management frame control of the AP 110 according to an example embodiment.

In operation 910, whether a power being supplied to the AP 110 is stable may be sensed. A state in which the power being supplied to the AP 110 is stable may indicate a state maintained without a change in a surrounding environment. In addition, the state in which the power being supplied to the AP 110 is stable may indicate a level less than a predetermined danger level required for a daily life of creatures, including humans. Also, the state in which the power being supplied to the AP 110 is stable may indicate a situation of a level lower than a danger level acceptable for daily life, as well as a predetermined situation defined based on a system management level and a natural disaster, for example, a typhoon or a flood.

For example, using an umbrella in a rainy situation may cause a relatively small inconvenience and thus, be included in a stable situation. However, when the umbrella is broken due to a strong wind, or a road is submerged due to heavy rainfall, an interruption may be caused to a daily life and thus, correspond to a unstable situation.

In operation 920, when the power being supplied to the AP 110 is stable, a period of the beacon frame 111 may be reduced, and a number of retransmissions of the probe response frame 112 may be increased.

In operation 930, when the power being supplied to the AP 110 is unstable, the period of the beacon frame 111 may be increased, and the number of retransmissions of the probe response frame 112 may be reduced.

Although not shown in drawings, in a management frame control of the AP 110, a to function of control may be performed based on a determined control policy irrespective of a dynamic system situation, with respect to information input by the system policy control unit 560.

In a management frame control of the AP 110, a management frame of the AP 110 may be dynamically controlled to reduce an amount of wireless traffic occurring around a system. When the amount of wireless traffic is reduced, a wireless local area network (WLAN) environment around the system may be improved and thus, allocation of additional wireless resources for transmission and reception of a data frame related to an actual service may be allowed.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these to embodiments without departing from the principles and spirit of the invention, the scope of which is defined by the claims and their equivalents.

What is claimed is:

1. An access point (AP) comprising:
a beacon frame generator configured to generate a beacon frame;
a probe response generator configured to generate a probe response frame; and
a management frame controller configured to control at least one of a transmission period of the beacon frame and a number of retransmissions of the probe response frame, based on at least one of a power consumption of the AP, a system load imposed on a system including the AP, and an emergency level related to whether an emergency occurs,
wherein, in response to a connected STA shifting from a sleep mode to an active mode, the management frame controller is configured to suspend controlling one of the period of the beacon frame and the number of retransmissions of the probe response frame,
wherein, in response to a difference between a predetermined level and at least one of the period of the beacon frame and the number of retransmissions of the probe response frame being greater than or equal to a preset value, the management frame controller is configured to control the period of the beacon frame or the number of retransmissions of the probe response frame to reduce a degree of the difference while controlling one of the period of the beacon frame and the number of probe response frame retransmissions is suspended, and
wherein, in response to the emergency occurring, the management frame controller is configured to control the period of the beacon frame or the number of retransmissions of the probe response frame based on whether a power is being stably supplied to the AP.

2. The AP of claim 1, wherein the management frame controller comprises a priority controller configured to control a priority set for at least one of the power consumption, the system load, and the emergency level.

3. The AP of claim 1, wherein the management frame controller comprises a system policy controller configured to determine a management policy for an AP system.

4. The AP of claim 1, wherein the management frame controller is configured to sense that a connected station (STA) enters a sleep mode, and transfer, to the STA, information associated with the period of the beacon frame.

5. The AP of claim 1, wherein the management frame controller is configured to sense that a connected STA enters a sleep mode, increase the period of the beacon frame, and reduce the number of probe response frame retransmissions.

6. The AP of claim 1, wherein, in response to the system load being increased, the management frame controller is configured to increase the period of the beacon frame and reduce the number of retransmissions of the probe response frame.

7. The AP of claim 1, wherein, in response to the system load being reduced, the management frame controller is configured to increase the number of retransmissions of the probe response frame, and reduce the period of the beacon frame based on whether an amount of internal resources available in the system is greater than a threshold.

8. The AP of claim 1, wherein, in response to the power being stably supplied, the management frame controller is configured to reduce the period of the beacon frame, increase the number of retransmissions of the probe response frame, and, in response to the power supplied being unstable, the management frame controller is configured to increase the period of the beacon frame and reduce the number of retransmissions of the probe response frame.

9. A management frame control method of an access point (AP), comprising:
generating a beacon frame transmitted to at least one station (STA) or a probe response frame corresponding to a probe request frame received from the at least one STA;
monitoring at least one of a power consumption of the AP, a system load imposed on a system including the AP, and an emergency level related to whether an emergency occurs; and
controlling at least one of a transmission period of the beacon frame and a number of retransmissions of the probe response frame based on at least one of the power consumption, the system load, and the emergency level;
suspending, in response to a connected STA shifting from a sleep mode to an active mode, controlling one of the period of the beacon frame and the number of retransmissions of the probe response frame;
controlling, in response to a difference between a predetermined level and at least one of the period of the beacon frame and the number of retransmissions of the probe response frame being greater than or equal to a preset value, the period of the beacon frame or the number of retransmissions of the probe response frame to reduce a degree of the difference while controlling one of the period of the beacon frame and the number of probe response frame retransmissions is suspended, and
controlling, in response to the emergency occurring, the period of the beacon frame or the number of retransmissions of the probe response frame based on whether a power is being stably supplied to the AP.

10. The method of claim 9, further comprising:
controlling a priority set for at least one of the power consumption, the system load, and the emergency level,
wherein the controlling of at least one of the period of the beacon frame and the number of retransmissions of the probe response frame comprises controlling at least one of the period of the beacon frame and the number of retransmissions of the probe response frame in consideration of at least one of the power consumption, the system load, and the emergency level, based on the set priority.

11. The method of claim 9, wherein the controlling comprises sensing that a connected STA enters a sleep mode, increasing the period of the beacon frame, and reducing the number of retransmissions of the probe response frame.

12. An access point (AP) comprising:
a beacon frame generator configured to generate a beacon frame;
a probe response generator configured to generate a probe response frame; and
a management frame controller configured to control at least one of a transmission period of the beacon frame and a number of retransmissions of the probe response frame, based on at least one of a power consumption of the AP, a system load imposed on a system including the AP, and an emergency level related to whether an emergency occurs, wherein, in response to a connected STA shifting from a sleep mode to an active mode, the management frame controller is configured to suspend controlling one of the period of the beacon frame and the number of retransmissions of the probe response frame,
wherein, in response to the emergency occurring, the management frame controller is configured to control the period of the beacon frame or the number of retransmissions of the probe response frame based on whether a power is being stably supplied to the AP, and
wherein, in response to the power being stably supplied, the management frame controller is configured to reduce the period of the beacon frame, increase the number of retransmissions of the probe response frame, and, in response to the power supplied being unstable, the management frame controller is configured to increase the period of the beacon frame and reduce the number of retransmissions of the probe response frame.

* * * * *